(12) United States Patent
Gallant et al.

(10) Patent No.: US 8,547,975 B2
(45) Date of Patent: Oct. 1, 2013

(54) PARALLEL PROCESSING FOR MULTIPLE INSTANCE REAL-TIME MONITORING

(75) Inventors: John Kenneth Gallant, Sterling, VA (US); Jagadeesh Babu Nalluri, Herndon, VA (US); Steven D. Miller, Cabin John, MD (US)

(73) Assignee: Verisign, Inc., Dulles, VA (US)

( * ) Notice: Subject to any disclaimer, the term of this patent is extended or adjusted under 35 U.S.C. 154(b) by 135 days.

(21) Appl. No.: 13/170,528

(22) Filed: Jun. 28, 2011

(65) Prior Publication Data

US 2013/0003567 A1    Jan. 3, 2013

(51) Int. Cl.
*H04J 1/16* (2006.01)

(52) U.S. Cl.
USPC .......................................... 370/389; 370/235

(58) Field of Classification Search
USPC ................. 370/389, 252, 360, 363, 368, 371, 370/378, 381, 386, 395.31, 395.71, 395.7
See application file for complete search history.

(56) References Cited

U.S. PATENT DOCUMENTS

| | | | |
|---|---|---|---|
| 6,061,725 A | 5/2000 | Schwaller et al. |
| 6,976,069 B1 | 12/2005 | Klingman |
| 7,099,879 B2 | 8/2006 | Tacaille et al. |
| 7,543,054 B1 | 6/2009 | Bansod et al. |
| 7,551,633 B1 | 6/2009 | MacBride |
| 7,860,965 B1 | 12/2010 | Bain et al. |
| 2005/0286685 A1 | 12/2005 | Vukovljak et al. |
| 2007/0150581 A1 | 6/2007 | Banerjee et al. |
| 2008/0176582 A1 | 7/2008 | Ghai et al. |
| 2009/0097413 A1 | 4/2009 | Todd et al. |
| 2010/0064039 A9 | 3/2010 | Ginter et al. |
| 2010/0169591 A1 | 7/2010 | Atluri et al. |
| 2011/0099284 A1* | 4/2011 | Gallant et al. ................ 709/231 |

FOREIGN PATENT DOCUMENTS

| | | |
|---|---|---|
| WO | 2006128007 A2 | 11/2006 |
| WO | 2009018578 A2 | 2/2009 |

OTHER PUBLICATIONS

Vern Paxson et al., "An Architecture for Exploiting Multi-Core Processors to Parallelize Network Intrusion Prevention," Sarnoff Symposium, IEEE, Apr. 30, 2007, Piscataway, NJ, pp. 1-7.
Extended European Search Report, issued from the European Patent Office, dated Oct. 29, 2012, in corresponding European Patent Application No. 12173968.4, 10 pages.
Best, Daniel M. et al., "Real-time visualization of network behaviors for situational awareness," VizSec '10 Proceedings of the Seventh International Symposium on Visualization for Cyber Security, ACM, New York, NY, Sep. 2010, ISBN: 978-1-4503-0013-1.

(Continued)

*Primary Examiner* — Brenda H Pham
(74) *Attorney, Agent, or Firm* — MH2 Technology Law Group, LLP

(57) ABSTRACT

Systems and methods are disclosed for analyzing network traffic data to generate complex statistics associated with the network traffic in real-time through parallel processing and data pipelining. In one implementation, a system includes a processor and a memory. The memory stores instructions that cause the processor to generate a plurality of program instances, wherein a first program instance observes the network traffic and uses a plurality of execution threads to distribute portions of the network traffic to additional program instances tasked with generating statistics associated with the network traffic. In other embodiments, a plurality of additional execution threads to the first program instance are tasked with generating the statistics. In either case, the generated statistics are placed into a data pipeline organized into time intervals of generated statistics, wherein the computation of higher-order statistics are computed as the lower-order time intervals are processed.

24 Claims, 10 Drawing Sheets

(56) References Cited

OTHER PUBLICATIONS

Gonzalez-Castano, Francisco J. et al., "Real-time interception systems for the GSM protocol," IEEE Transactions on Vehicular Technology, v 51, n 5, p. 904-914, Sep. 2002; ISSN: 00189545; DOI: 10.1109/TVT.2002.801547; Publisher: Institute of Electrical and Electronics Engineers Inc.

* cited by examiner

PARALLEL PROCESSING FOR MULTIPLE INSTANCE REAL-TIME MONITORING

TECHNICAL FIELD

This disclosure is generally directed to systems and methods for analyzing network traffic data. More specifically, this disclosure is directed to systems and methods for monitoring, processing, and generating real-time statistics for very high and sustained network traffic through parallel processing.

BACKGROUND

Companies collect statistics associated with network traffic to observe, among other things, how well the company's network services are performing. This helps the companies identify and diagnose service problems, such as those that may result from hardware failures, software defects, or network service attacks. Thus, determining anomalies and the causes of anomalies in network traffic may enable networks to function more efficiently. For example, being able to detect sudden increases or decreases in network traffic and determining who or what is responsible for the sudden changes can help ensure that information is exchanged efficiently across networks. Companies may also wish to keep official statistics for network functions, particularly companies associated with Internet services. Thus, companies seek high-performance network traffic monitoring systems capable of producing detailed and accurate statistics regarding their network traffic.

Nevertheless, existing systems for real-time monitoring of network traffic suffer from several disadvantages. For example, existing systems generally utilize multiple network interface packet capture processes, resulting in the use of significant processing resources that rapidly increase with each additional packet capture process. Further, the complexity of any generated statistics tends to result in a proportional trade-off in both timeliness and processing resources.

Thus, existing systems for monitoring network traffic tend to focus on high performance at the expense of depth of analysis or, alternatively, attempt to provide a detailed analysis but do so at the expense of time and resources. Accordingly, no system currently exists that provides a sufficient combination of high-performance and in-depth analyses. The speed and amount of network data, meanwhile, continue to increase. Thus, a need exists for a system able to provide meaningful analyses in real-time.

SUMMARY

Systems and methods consistent with disclosed embodiments analyze network traffic data. Specifically, different embodiments monitor, process, and generate real-time statistics for very high and sustained network traffic though parallel processing and data pipelining.

According to some embodiments, the systems and methods may generate statistics associated with passively observed network traffic. Network data packets associated with observed network traffic may be routed to particular program instances based on routing rules and properties associated with the data packets. The routed data packets may be processed through a series of buffers and queues to avoid dropped packets before being picked up by the program instances. The program instances may generate statistics associated with the routed network packets. Finally, the generated statistics may be placed into the data pipeline. Other embodiments may employ additional execution threads of a single program instance to generate the statistics, rather than multiple program instances.

In other embodiments, the network data packets may be load balanced by routing the network data packets according to program instance capacity, rather than routing rules and network packet properties. In such an embodiment, a backend program instance may coalesce the generated statistics before placing the combined statistics into a data pipeline.

Consistent with other disclosed embodiments, computer-readable storage devices may store program instructions that are executable by one or more processors to implement any of the methods, disclosed herein.

Additional objects and advantages of disclosed embodiments will be set forth in part in the description which follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DESCRIPTION OF THE EMBODIMENTS

Figure 1:
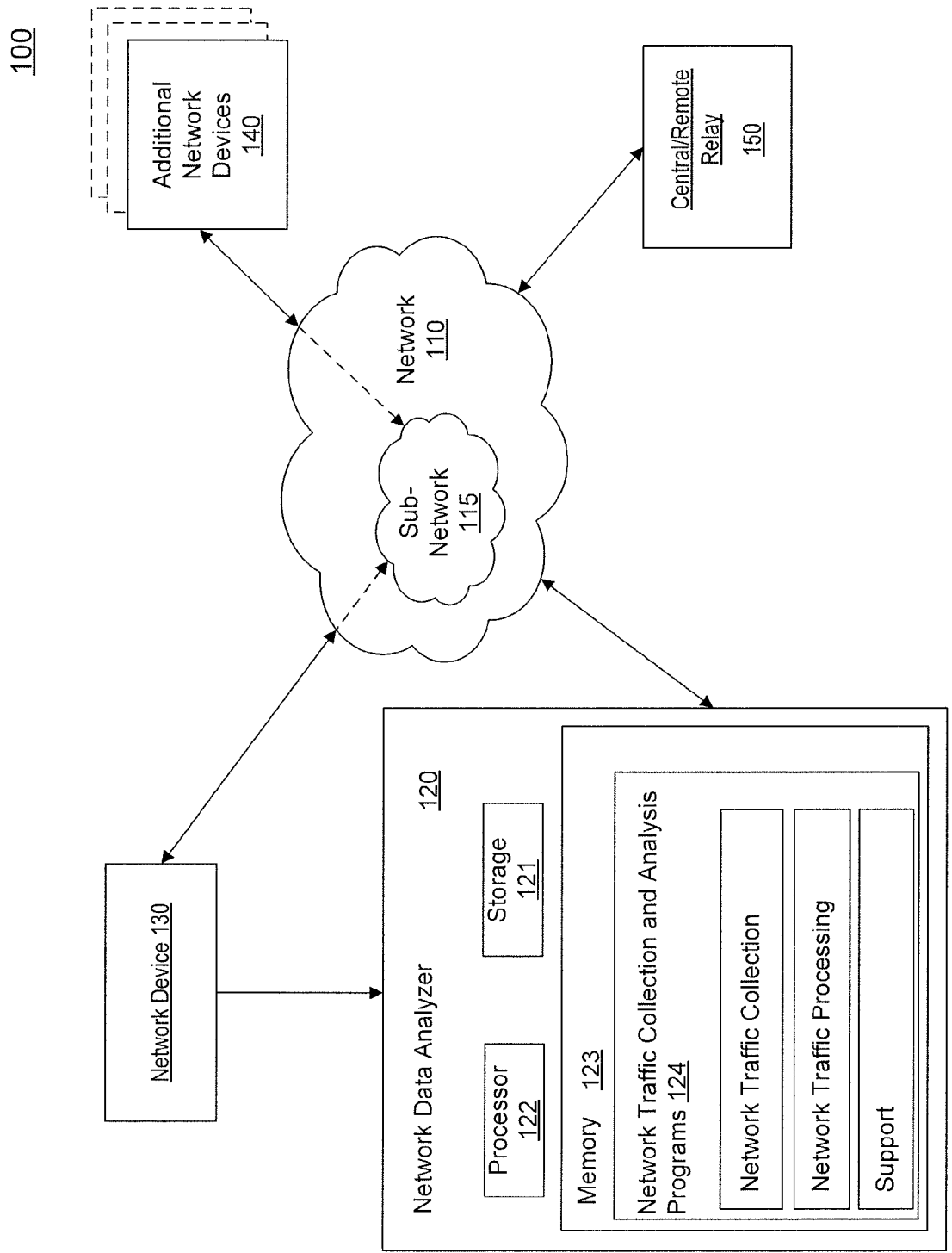
FIG. 1 is a diagram illustrating an exemplary network traffic analyzing system that may be used to implement disclosed embodiments.

The following detailed description refers to the accompanying drawings. Whenever possible, the same reference numbers are used in the drawing and the following description to refer to the same or similar parts. While several exemplary embodiments and features of the invention are described herein, modifications, adaptations, and other implementations are possible, without departing from the spirit and scope of the invention. Instead, the proper scope of the invention is defined by the appended claims.

FIG. 1 is a diagram illustrating system 100 for monitoring, processing, and generating statistics for network traffic, including exemplary system components. The components and arrangement, however, may vary. Network data analyzer server 120 may include a processor 122, a memory 123, input/output (I/O) devices (not shown), and storage 121. The network data analyzer server 120 may be implemented in various ways. For example, it may take the form of a general purpose computer, a server, a mainframe computer, or any combination of these components. In some embodiments, network data analyzer server 120 may include a cluster of servers capable of performing network analysis. Network data analyzer server 120 may communicate over a link with network device 130. For example, the link may constitute a direct communication link, a LAN, a WAN, or other suitable connection. The communication link may be any source of network traffic, including, for example, a port dedicated to port mirroring/monitoring such as a Switched Port Analyzer (SPAN) port. In some embodiments, network device 130 may be a router, and the network data analyzer server 120 may communicate over a link with the router to observe all network traffic passing through the router on Sub-Network 115.

Processor 122 may include one or more known processing devices, such as a microprocessor from the Pentium™ or Xeon™ family manufactured by Intel™, the Turion™ family manufactured by AMD™, or any of various processors manufactured by Sun Microsystems. Memory 123 may include one or more storage devices configured to store information used by processor 122 to perform certain functions related to disclosed embodiments. Storage 121 may include a volatile or non-volatile, magnetic, semiconductor, tape, optical, removable, nonremovable, or other type of storage device or computer-readable medium.

In some embodiments, memory 123 may include one or more network data collection and analysis programs or subprograms 124 loaded from storage 121 or elsewhere that, when executed by network data analyzer server 120, perform various procedures, operations, or processes consistent with disclosed embodiments. In one embodiment, memory 123 may include a network data collection and analysis program 124 that monitors network traffic associated with network traffic through network device 130; performs packet capture (PCAP) functions, logs data associated with the network traffic; processes the stored data associated with network traffic; computes statistics associated with the network traffic; reports the network traffic statistics; and an integrative support program that links the other programs, allowing them to use a common data storage, provides a common user interface, performs basic bookkeeping tasks, and provides user guidance and help.

Methods, systems, and articles of manufacture consistent with disclosed embodiments are not limited to separate programs or computers configured to perform dedicated tasks. For example, memory 123 may be configured with a network data collection and analysis programs 124 that performs several functions when executed by processor 122. For example, memory 123 may include a single program 124 that performs the functions of the network data analyzer server 120, or program 124 could comprise multiple programs. Moreover, processor 122 may execute one or more programs located remotely from network data analyzer server 120. For example, network data analyzer server 120 may access one or more remote programs that, when executed, perform functions related to disclosed embodiments.

Memory 123 may also be configured with an operating system (not shown) that performs several functions well known in the art when executed by network data analyzer server 120. By way of example, the operating system may be Microsoft Windows™, Unix™, Linux™, Solaris™, or some other operating system. The choice of operating system, and even the use of an operating system, is not critical to any embodiment.

Network data analyzer server 120 may include one or more I/O devices (not shown) that allow data to be received and/or transmitted by network data analyzer server 120. I/O devices may also include one or more digital and/or analog communication input/output devices that allow network data analyzer server 120 to communicate with other machines and devices, such as Central/Remote Relay 150. Central/Remote Relay 150 may include one or more files or databases that store information and are accessed and/or managed through network data analyzer server 120. By way of example, the databases may be Oracle™ databases, Sybase™ databases or other relational databases, or non-relational databases, such as Hadoop sequence files, HBase or Cassandra. The databases or other files may include, for example, data and information related to the source and destination of a network request, the data contained in the request, etc. Systems and methods of disclosed embodiments, however, are not limited to separate databases.

Network data analyzer server 120 may receive data from external machines and devices and output data to external machines and devices via I/O devices. The configuration and number of input and/or output devices incorporated in I/O devices may vary as appropriate for certain embodiments. Network data analyzer server 120 may be standalone, or it may be part of a subsystem, which may, in turn, be part of a larger system, such as the Central/Remote Relay 150.

FIG. 1 shows network data analyzer server 120 including network data collection and analysis programs 124. In some embodiments, however, another server(s) other than the network data analyzer server 120 may perform network data collection and processing procedures consistent with the procedures performed by network data collection and analysis programs 124. In these embodiments, network data analyzer server 120 may retrieve data from the other server(s) or from a database and perform analyses on this data using network data collection and analysis programs 124. In some embodiments, network data analyzer server 120 may include a cluster of servers capable of performing distributed data analysis. For example, one server may observe network traffic and split up the network stream for analysis, as further described below, while other servers may process and compute statistics associated with the sub-components of the network stream. In these embodiments, network data collection and analysis programs 124 may support distributed computing frameworks, e.g., Google's MapReduce framework, etc.

One or more network devices 130 may be communicatively connected to Network 110. Network 110 may include the Internet. Network devices 130 may be network load balancers, network routers, switches, computers, servers, laptops, mainframes, or other network devices. Network device(s) 130 may observe traffic associated with one or more network site(s), one or more network site silos, and/or one or more network services. For example, in a hierarchical network of nodes comprising network sites and associated silos, network devices 130 may be placed at any node of the hierarchy such that all network traffic for all nodes below that hierarchical level are observed. One or more additional network devices 140 may also be communicatively connected to Network 110. Network devices 140 may be network load balancers, network routers, switches, computers, servers, laptops, mainframes, or other devices capable of communicating via a network. Network devices 140 may generate the observed network traffic.

Figure 2A:
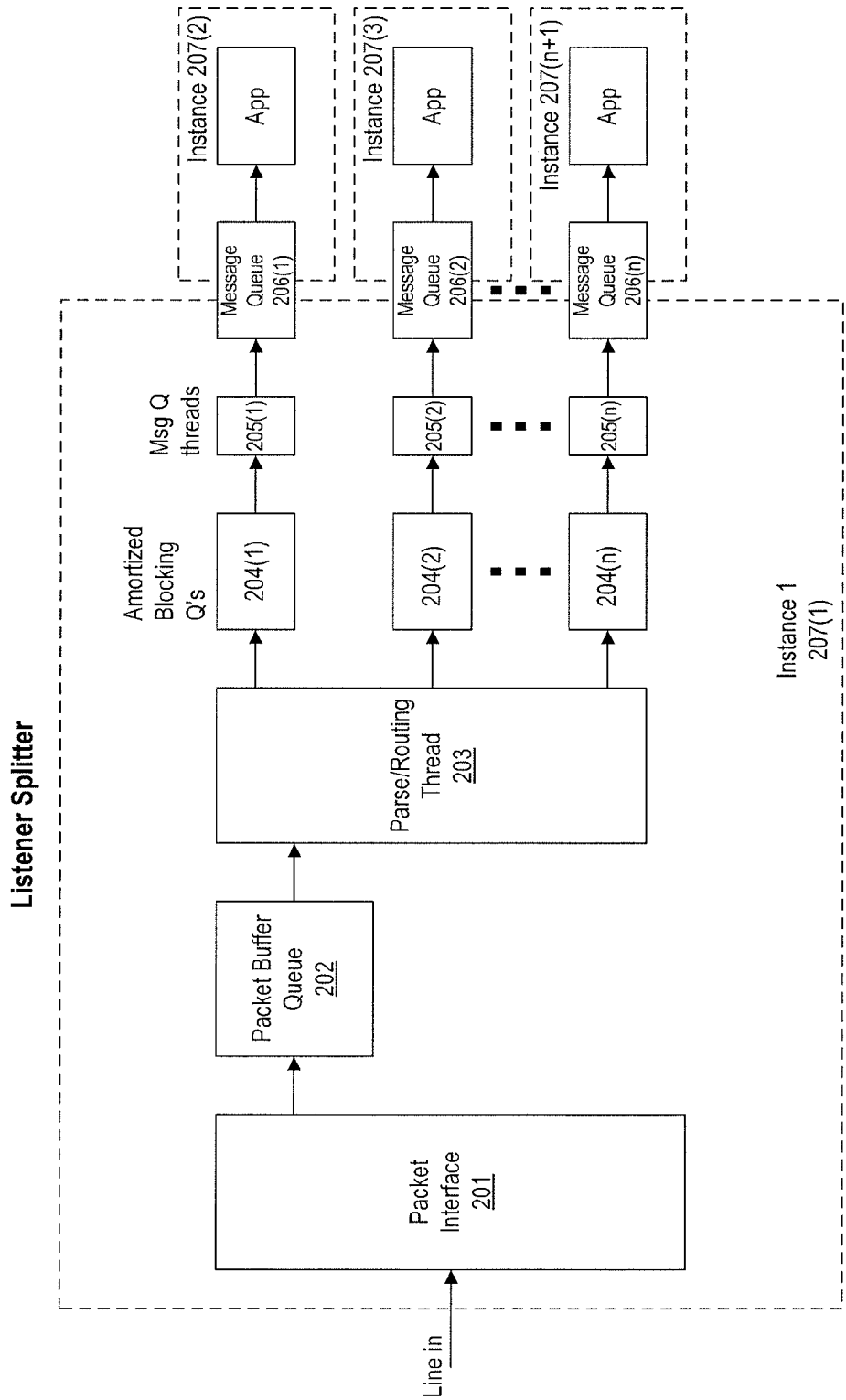
FIG. 2A is a diagram illustrating an exemplary buffer and shared memory configuration, as well as an exemplary process threading design, consistent with disclosed embodiments.

FIG. 2A is a diagram illustrating an exemplary buffer and shared memory configuration, as well as an exemplary process threading design implemented by, for example, an application instance of the network data collection and analysis programs 124. Listener instance 207(1), the Listener Splitter, may include several threads of execution.

In one embodiment, Packet Interface 201 is the main thread which creates other application threads, such as the below-discussed Parse/Routing Thread 203, Message Queue Threads 205(1)-205(n), and Reporting Thread. Packet Interface 201 also reads and orders network data packets associated with a network data stream using a packet capture library, such as PCAP, and places the ordered packets in shared memory, such as packet buffers queue 202, for subsequent processing by other threads.

Parse/Routing Thread 203 fetches the data packets from the shared memory (packet buffer queues 202) and parses them so that it may identify particular properties of the data packets, such as the source and destination IP addresses, transport layer ports, Top-Level Domains (TLD), or any other feature of a network data packet. Parse/Routing Thread 203 next breaks up the network data stream by filtering the data packets according to filtering/routing rules and determined packet properties. The filtering/routing rules may be based directly upon the determined packet properties, such as the destination IP address, or indirectly from the determined packet properties using, for example, regular expression pattern matching. Parse/Routing Thread 203 may break up the data stream according to the filtering/routing rules by, for example, associating the data packets with one or more listener instance 207(2)-207(n+1) tasked with computing statistics for a particular packet property or properties. For example, all data packets associated with a destination IP by the filtering/routing rules may be routed to a listener instance or instances tasked with computing statistics associated with that destination IP. Once associated with a listener instance, the filtered data packets may be placed on the appropriate shared memories, such as amortized blocking queues 204(1)-204(n).

Accordingly, the network data stream need only be observed by a single listening instance, which reduces the computation load on the network data analyzer 120. Further, because the network data stream is divided among listener instances 207(1)-207(n+1) according to the filtering/routing rules, the computation of statistics is highly parallel and does not require the network data stream be copied, as often found in existing systems, further reducing the computational load on network data analyzer 120.

Message Queue Threads 205(1)-205(n) fetch the routed packets from amortized blocking queues 204(1)-204(n) and place the routed packets on memory shared with the associated listener instances 207(1)-207(n+1), such as listener message queues 206(1)-206(n). Listener instances 207(2)-207(n+1) subsequently pick up the data packets from the shared memory and compute statistics according to its defined purpose. As further described below, the computed statistics are then placed by listener instances 207(2)-207(n+1) into a data pipeline.

A Reporting Thread (not pictured) may periodically obtain reporting information and publishes them to, for example, Central/Remote Relay 150. Reporting information may include the number of packets read from the interface, the number of packets dropped by kernel, the number of packets routed to each listener instance tasked with computing statistics for the routed packets, the number of packets discarded due to queue overflows, and/or heartbeat messages indicating availability.

Figure 2B:
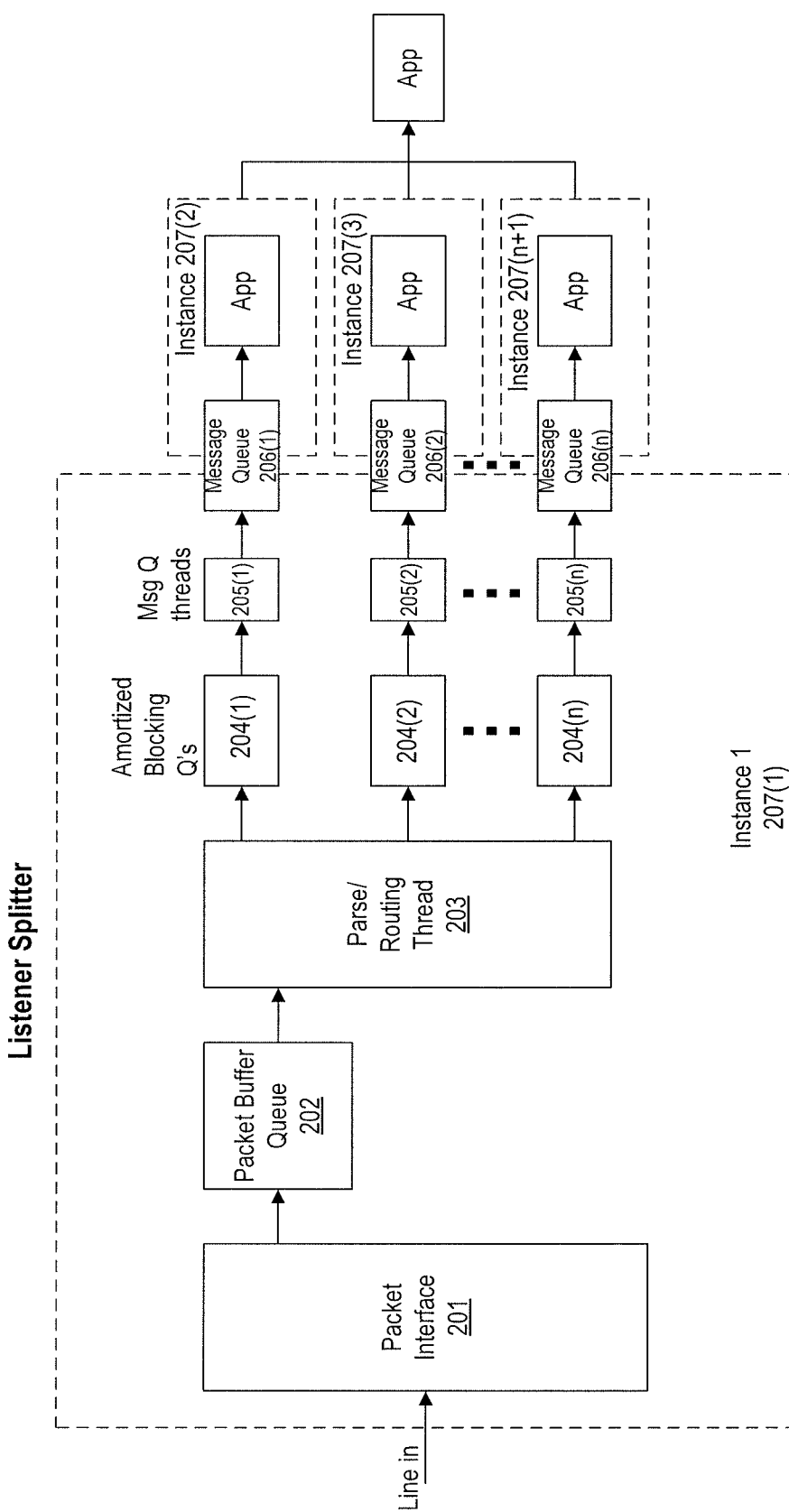
FIG. 2B is a diagram illustrating an exemplary buffer and shared memory configuration, as well as an exemplary process threading design, consistent with disclosed embodiments.

FIG. 2B is a diagram illustrating an exemplary buffer and shared memory configuration, as well as an exemplary process threading design implemented by, for example, an application instance of the network data collection and analysis programs 124. Alternatively, or additionally, listener instances 207(2)-207(n+1) may be directed to computing statistics associated with the same data packet property or properties. In such an embodiment, Parse/Routing Thread 203 may function as a load balancer by routing data packets to listener instances 207(2)-207(n+1) according to listener instance capacity. A backend listener instance (not pictured) may then coalesce the statistics generated by listener instances 207(2)-207(n+1) before placing the (now combined) statistics into a data pipeline.

Figure 3:
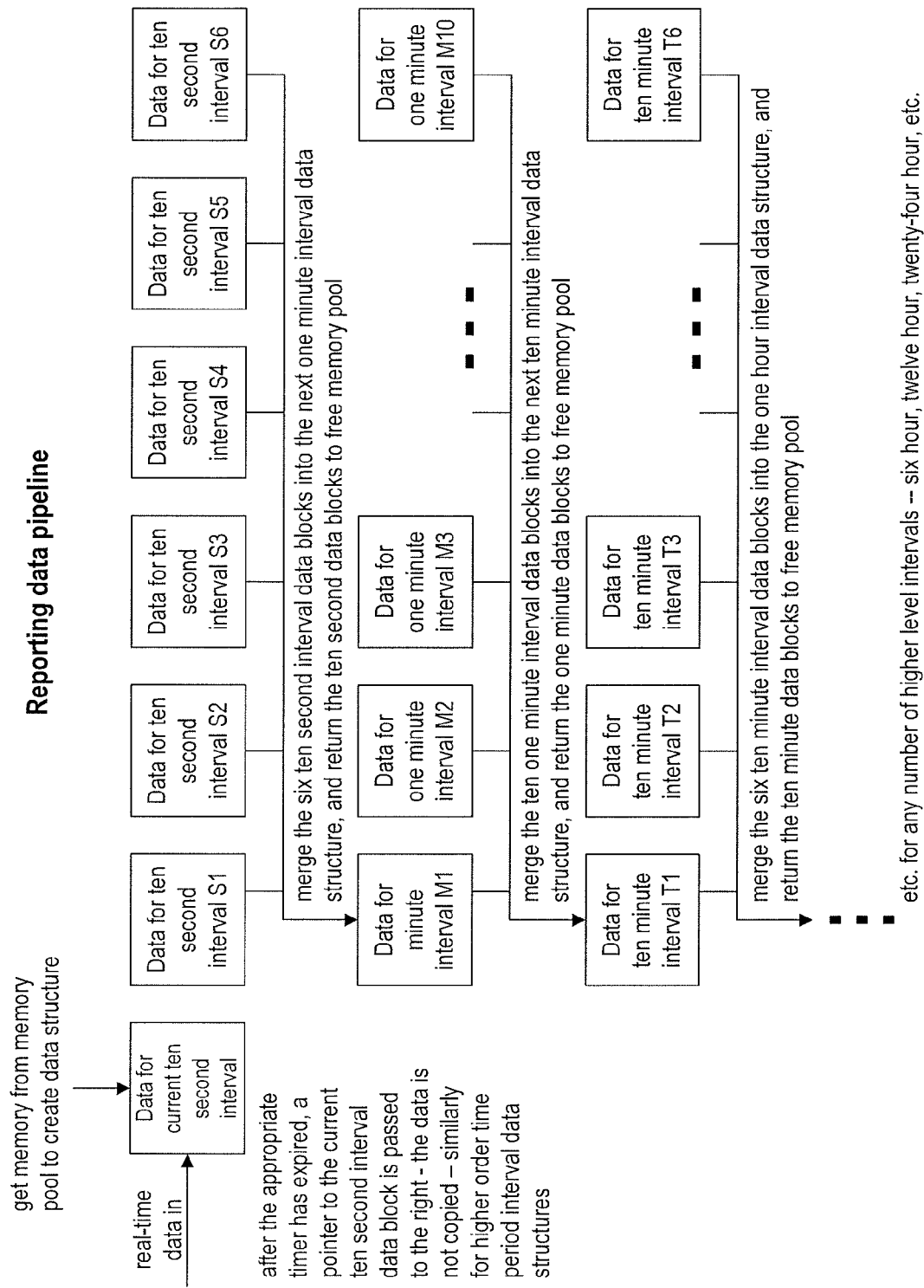
FIG. 3 is an exemplary data pipelining implementation, consistent with disclosed embodiments.

FIG. 3 is an exemplary data structure implementing a data pipeline consistent with disclosed embodiments. In FIG. 3, exemplary time intervals of ten seconds, one minute, ten minutes, and one hour are shown; however, these time intervals are illustrative only and other data structure configurations may be employed without departing from the spirit of the invention. As shown in FIG. 3, data structures are created for each time-based interval from memory taken from a memory pool. The data structure for the current time interval accepts real-time generated statistics associated with observed network data traffic. At the conclusion of the current time interval, the "pointer" to each data structure for the time intervals of the same order are associated with the next older time interval. A "pointer" is a programming language data type whose value refers directly to (or "points to") another value stored elsewhere in memory using its address. When a sufficient number of time intervals have been collected to constitute a higher-order time interval, the lower time-based intervals are merged to form a higher time-based interval. In some embodiments, the pointers associated with each lower-order time interval may be passed to an execution thread that merges the data structures for the lower-ordered time intervals. Thus, the data associated with each time interval is not copied, allowing the computation of higher-order time intervals while lower-order time intervals are processed. This process may be repeated down the pipeline for any number of higher level intervals.

Thus, the data-pipeline prioritizes speed over space by not copying data from one time interval to another. When a time interval is expired, its memory is returned to the memory pool. Additionally, once a data block is merged into a higher order time interval, the associated memory is returned. Thus, if there are six ten second intervals that make up a minute, all six data blocks associated with the ten second intervals are not necessarily retained for a full minute.

Figure 4:
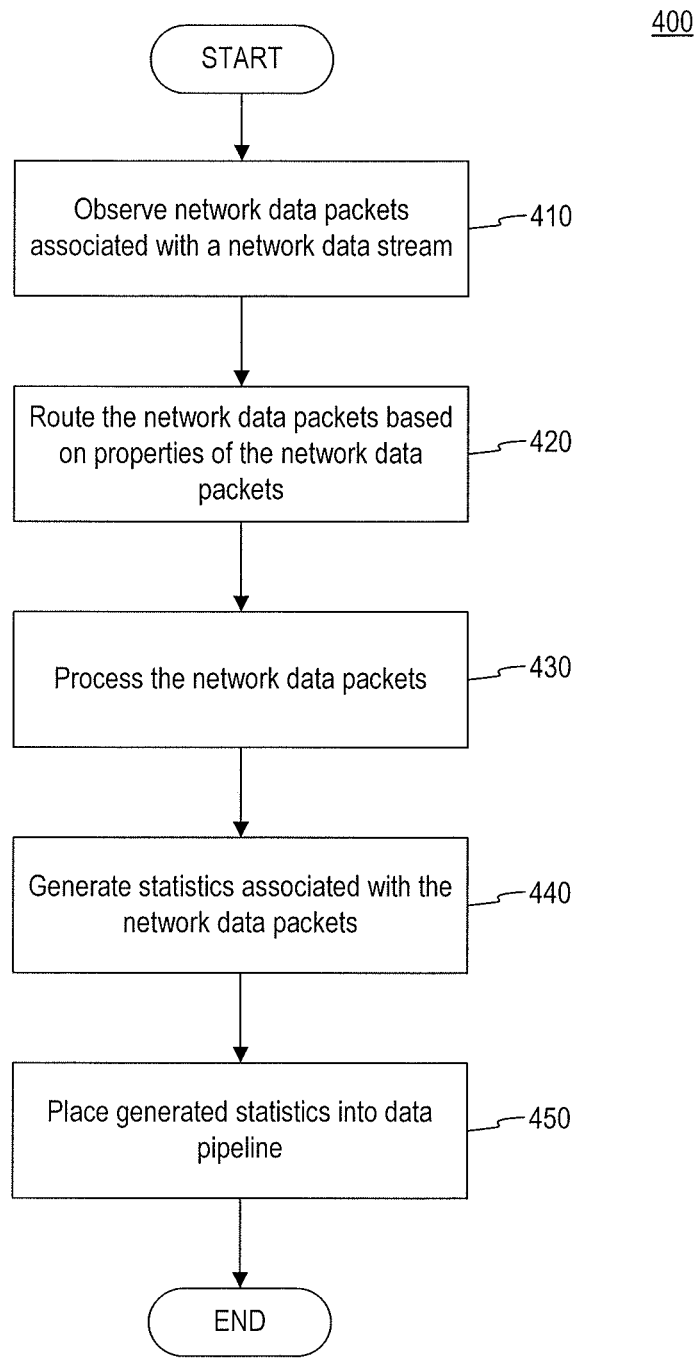
FIG. 4 is a flow diagram for analyzing network traffic data, consistent with disclosed embodiments.

FIG. 4 is a flow diagram for analyzing network traffic data, consistent with disclosed embodiments. Network data analysis server 120 may perform process 400, for example. In certain embodiments, process 400 may be implemented according to network data collection and analysis programs 124. In some embodiments, process 400 may be performed by one or more servers using a distributed computing framework such as the MapReduce framework.

At step 410, network data packets associated with a network data stream may be observed. In one embodiment, the monitoring may be accomplished on a dedicated to port mirroring/monitoring, such as a SPAN port and utilizing PCAP. As indicated above, PCAP consists of an application programming interface for capturing network traffic. At step 420, the observed network data packets may be routed based on properties associated with the data packets. Properties associated with the data packets may include, for example, source or destination Internet Protocol (IP) addresses, Top-Level Domain, port, type of DNS query, or any other feature of a packet. At step 430, the routed network data packets may be processed. At step 440, statistics associated with the routed network packets may be generated. The generated statistics may indicate, for example, the number of successful and/or unsuccessful requests to a particular server within the observed network. At step 450, the generated statistics may be placed into the data pipeline, such as the data pipeline depicted in FIG. 3.

Figure 5:
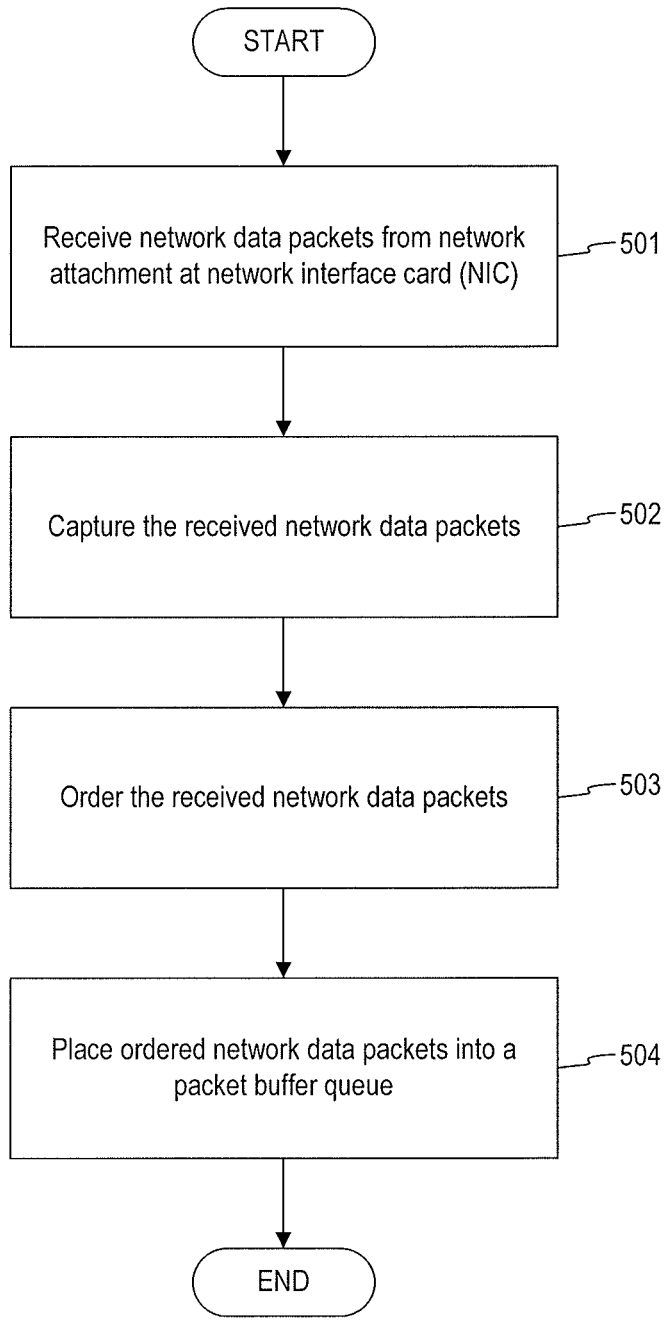
FIG. 5 is a flow diagram of a method for observing network data packets associated with a network stream, consistent with disclosed embodiments.

FIG. 5 is a flow diagram of a method for observing network data packets associated with a network stream, consistent with disclosed embodiments, including step 410 of FIG. 4. At step 501, network data packets may be received, for example, at a network interface controller (NIC) device. At step 502, the received network data packets may be captured using, for example, a PCAP program. At step 503, the captured network data packets may be ordered, also by a PCAP program. Finally, at step 504, the ordered network data packets may be placed in memory shared with, for example, Parse/Routing Thread 203. The shared memory may be, for example, packet buffer queue 202.

Figure 6:
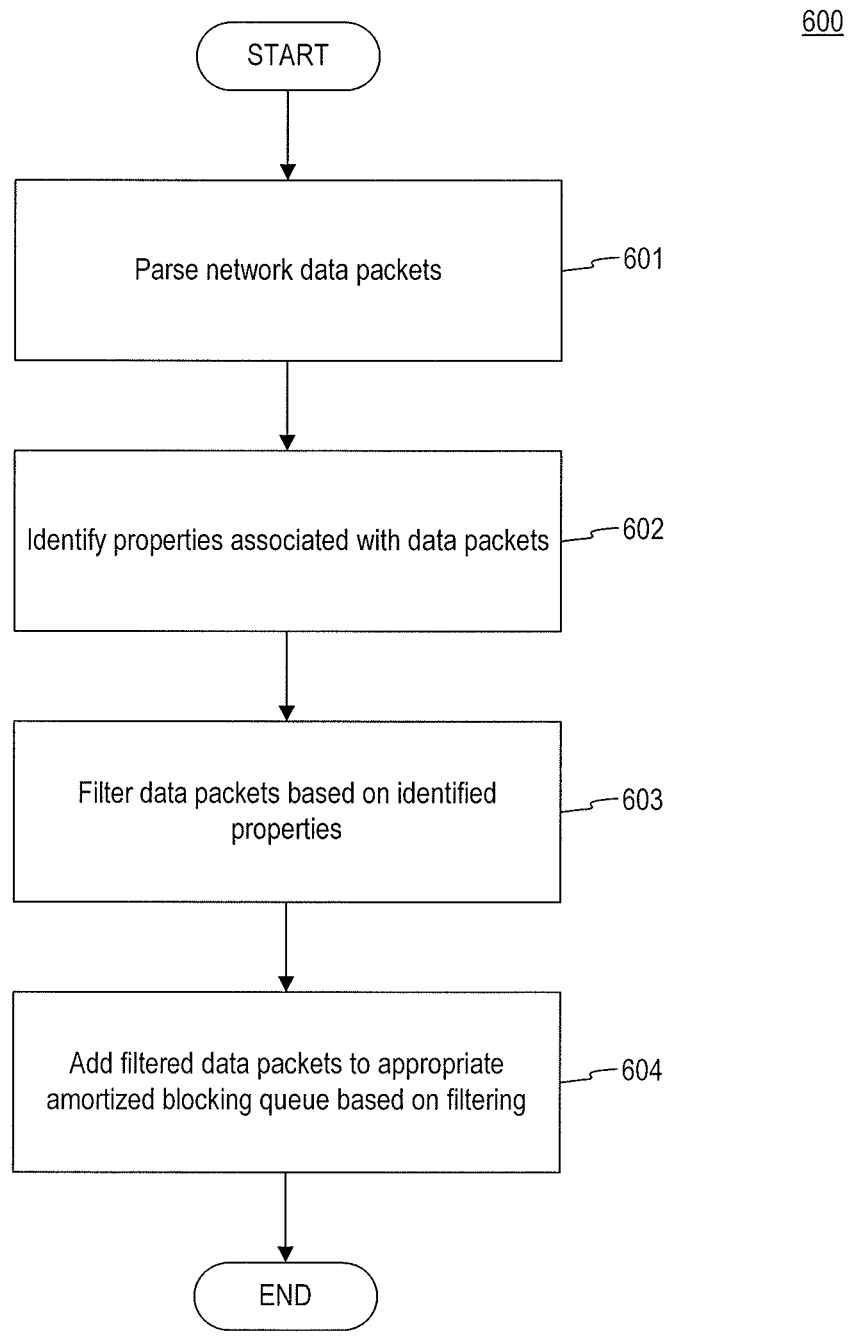
FIG. 6 is a flow diagram of a method for routing network packets based on properties of network data packets, consistent with disclosed embodiments.

FIG. 6 is a flow diagram of a method for routing network packets based on properties of network data packets, consistent with disclosed embodiments, including step 420 of FIG. 4. At step 601, network data packets are parsed into components that indicate a particular property of the packet, such as the destination network address. At step 602, properties associated with the data packets are identified from the parsed data. For example, the parsed data for a network data packet associated with the destination network address may indicate the observed packet's destination address is the IP 192.168.1.110. The destination address may correspond to, for example, a particular Internet service offered by a company. At step 603, the data packets may be filtered based on the identified properties. For example, every data packet associated with destination address 192.168.1.110 may be routed to a particular listener instance tasked with computing statistics associated with the hosting server of 192.168.1.110. Finally, at step 604, the filtered data packets may be appropriately routed to a listener instance 207(2)-207(n+1) by placing the filtered data packet into memory shared with message queue thread 205(1)-205(n). The shared memory may be, for example, amortized blocking queues 204(1)-204(n).

Figure 7:
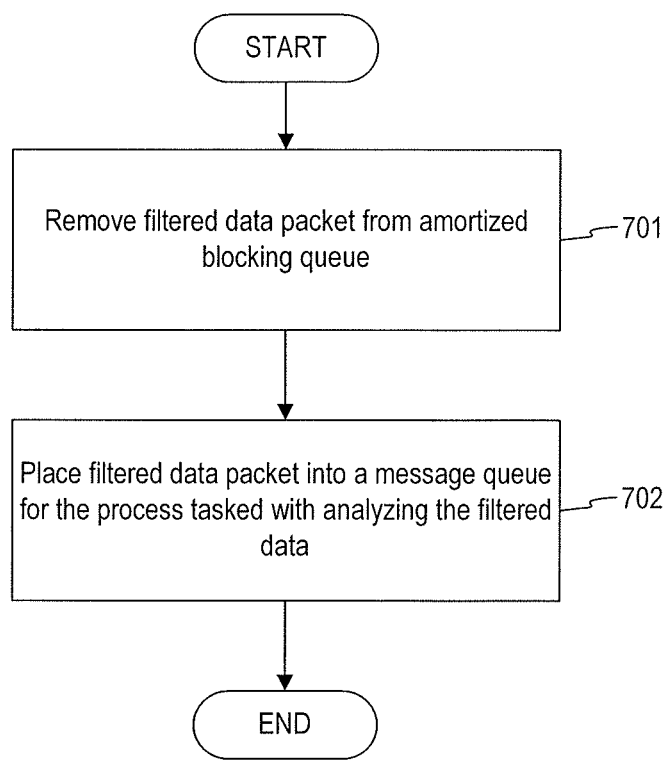
FIG. 7 is a flow diagram of a method for processing network data packets, consistent with disclosed embodiments.

FIG. 7 is a flow diagram of a method for processing network data packets, consistent with disclosed embodiments, including step 430 of FIG. 4. At step 701, filtered data packets may be removed from shared memory, such as amortized blocking queues 204(1)-204(n). At step 702, the filtered data packets may be placed into shared memory, such as Message Queues 206(1)-206(n), with listener instances tasked with computing statistics for the filtered data, such as listener instance 207(2)-207(n+1).

Figure 8:
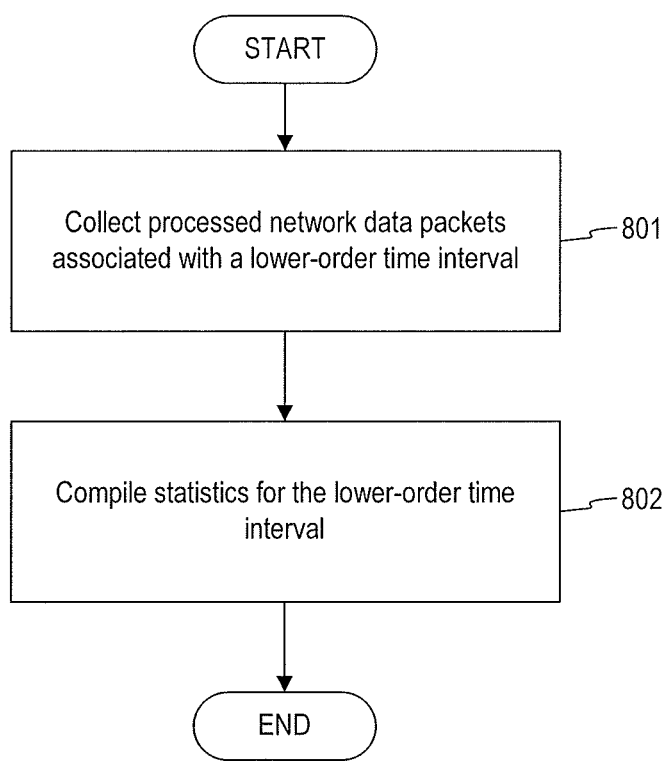
FIG. 8 is a flow diagram of a method for generating statistics associated with network data packets, consistent with disclosed embodiments.

FIG. 8 is a flow diagram of a method for generating statistics associated with network data packets, consistent with disclosed embodiments, including step 440 of FIG. 5. At step 801, processed network data packets associated with a lower-order time interval may be collected. In one embodiment, listener instances 207(1)-207(n+1) may collect the processed network data packets by removing the data packets from message queues 206(1)-206(n). At step 802, statistics for the lower-order time interval may be compiled by listener instances. In other embodiments, process 800 may be performed by additional execution threads of listener instance 207(1), rather than listener instances 207(2)-207(n+1).

Figure 9:
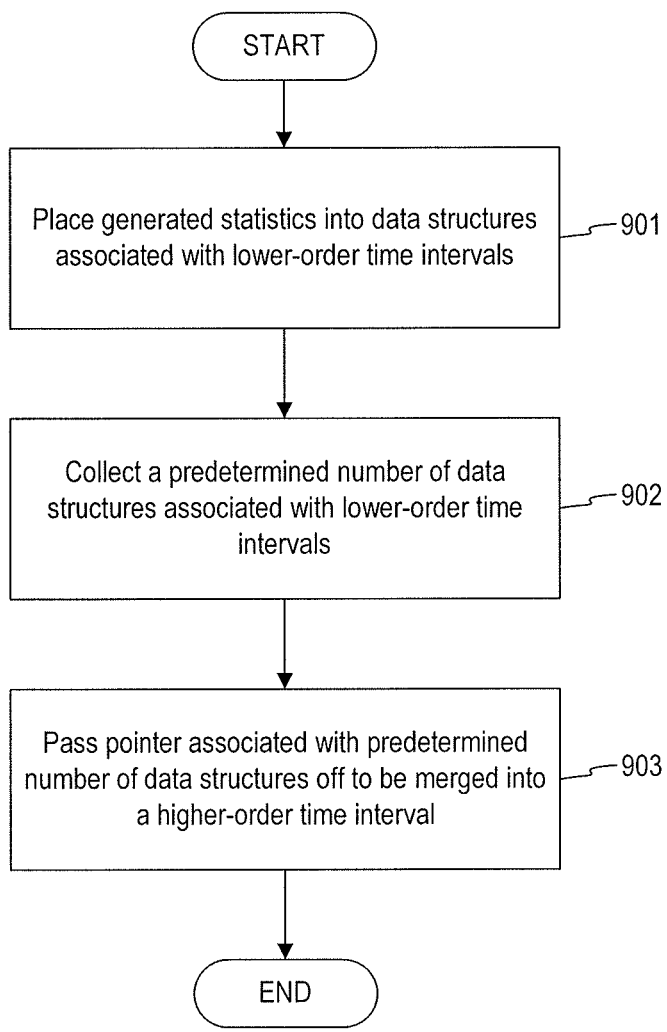
FIG. 9 is a flow diagram of a method for placing generated statistics into a data pipeline, consistent with disclosed embodiments.

FIG. 9 is a flow diagram of a method for placing generated statistics into a data pipeline, consistent with disclosed embodiments, including FIG. 3 and step 450 of FIG. 4. At step 901, generated statistics are placed into data structures associated with lower-order time intervals. At step 902, a predetermined number of data structures associated with lower-order time intervals are collected. At step 903, the pointer associated with the predetermined number of data structures are passed to an execution thread tasked with merging the data structures into a data structure for a higher-order time interval. This process may be repeated for n-order timer intervals.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, micro-processors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A computer-implemented method for analyzing network traffic, comprising:
   observing network data packets associated with a network data stream using a first process;
   performing operations on the data packets using a first thread of execution of the first process running a plurality of execution threads, comprising:
      routing the data packets to a plurality of first shared memories based on predetermined routing rules, removing the data packets stored in the plurality of first shared memories using additional threads from among the plurality of threads, each thread from among the plurality of threads dedicated to one of the plurality of first shared memories, and storing the data packets to a plurality of second shared memories using the dedicated threads;

computing statistics associated with the data packets stored in the plurality of second shared memories; and placing the computed statistics into a data pipeline, wherein the data pipeline stores the computed statistics according to time intervals, wherein the data pipeline comprises hierarchical levels of data structures associated with time intervals, the data structures of time intervals above the lowest-level comprising a predetermined number of data structures for the next-lower time interval.

2. The method of claim 1, wherein the network data packets are passively observed from a port dedicated to port mirroring.

3. The method of claim 1, wherein each of the plurality of first shared memories comprise a series of buffers forming amortized blocking queues, and each of the plurality of second shared memories comprise a series of buffers forming message queues.

4. The method of claim 1, wherein the predetermined routing rules are based on at least one of a network service, DNS request, type of DNS request, source network address, destination network address, transport layer port, or Top-Level Domain associated with the data packets.

5. The method of claim 1, wherein the predetermined routing rules are based on the processing capacity of threads of execution computing the statistics associated with the data packets.

6. The method of claim 1, wherein the statistics associated with the data packets stored in the plurality of second shared memories are computed using a plurality of second processes different than the first process.

7. The method of claim 1, wherein the statistics associated with the data packets stored in the plurality of second shared memories are computed using a second plurality of second execution threads of the first process.

8. The method of claim 1, further comprising:
placing the computed statistics into a data pipeline at data structures associated with the lowest-level time interval; and
merging the data structures associated with time intervals of the same level upon receipt of a predetermined number of data structures for the next-lower time interval.

9. A computer system for analyzing network traffic, comprising:
one or more processors; and
a memory system having instructions, that when executed by the one or more processors, cause the one or more processors to perform the operations of:
observing network data packets associated with a network data stream using a first process;
performing operations on the data packets using a first thread of execution of the first process running a plurality of execution threads, comprising:
routing the data packets to a plurality of first shared memories based on predetermined routing rules,
removing the data packets stored in the plurality of first shared memories using additional threads from among the plurality of threads, each thread from among the plurality of threads dedicated one of the plurality of first shared memories, and storing the data packets to a plurality of second shared memories using the dedicated threads;
computing statistics associated with the data packets stored in the plurality of second shared memories; and
placing the computed statistics into a data pipeline, wherein the data pipeline stores the computed statistics according to time intervals, wherein the data pipeline comprises hierarchical levels of data structures associated with time intervals, the data structures of time intervals above the lowest-level comprising a predetermined number of data structures for the next-lower time interval.

10. The system of claim 9, wherein the network data packets are passively observed from a port dedicated to port mirroring.

11. The system of claim 9, wherein each of the plurality of first shared memories comprise a series of buffers forming amortized blocking queues, and each of the plurality of second shared memories comprise a series of buffers forming message queues.

12. The system of claim 9, wherein the predetermined routing rules are based on at least one of a network service, DNS request, type of DNS request, source network address, destination network address, transport layer port, or Top-Level Domain associated with the data packets.

13. The system of claim 9, wherein the predetermined routing rules are based on the processing capacity of threads of execution computing the statistics associated with the data packets.

14. The system of claim 9, wherein the statistics associated with the data packets stored in the plurality of second shared memories are computed using a plurality of second processes different than the first process.

15. The system of claim 9, wherein the statistics associated with the data packets stored in the plurality of second shared memories are computed using a second plurality of second execution threads of the first process.

16. The system of claim 9, wherein the operations performed by the one or more processors further comprise:
placing the computed statistics into a data pipeline at data structures associated with the lowest-level time interval; and
merging the data structures associated with time intervals of the same level upon receipt of a predetermined number of data structures for the next-lower time interval.

17. A non-transitory computer-readable medium storing instructions for analyzing network traffic, the instructions operable to cause one or more computer processors to perform operations, comprising:
observing network data packets associated with a network data stream using a first process;
performing operations on the data packets using a first thread of execution of the first process running a plurality of execution threads, comprising:
routing the data packets to a plurality of first shared memories based on predetermined routing rules,
removing the data packets stored in the plurality of first shared memories using additional threads from among the plurality of threads, each thread from among the plurality of threads dedicated to one of the plurality of first shared memories, and
storing the data packets to a plurality of second shared memories using the dedicated threads; and
computing statistics associated with the data packets stored in the plurality of second shared memories;
placing the computed statistics into a data pipeline, wherein the data pipeline stores the computed statistics according to time intervals, wherein the data pipeline comprises hierarchical levels of data structures associated with time intervals, the data structures of time intervals above the lowest-level comprising a predetermined number of data structures for the next-lower time interval.

18. The medium of claim 17, wherein the network data packets are passively observed from a port dedicated to port mirroring.

19. The medium of claim 17, wherein each of the plurality of first shared memories comprise a series of buffers forming amortized blocking queues, and each of the plurality of second shared memories comprise a series of buffers forming message queues.

20. The medium of claim 17, wherein the predetermined routing rules are based on at least one of a network service, DNS request, type of DNS request, source network address, destination network address, transport layer port, or Top-Level Domain associated with the data packets.

21. The medium of claim 17, wherein the predetermined routing rules are based on the processing capacity of threads of execution computing the statistics associated with the data packets.

22. The medium of claim 17, wherein the statistics associated with the data packets stored in the plurality of second shared memories are computed using a plurality of second processes different than the first process.

23. The medium of claim 17, wherein the statistics associated with the data packets stored in the plurality of second shared memories are computed using a second plurality of second execution threads of the first process.

24. The medium of claim 17, wherein the instructions are further operable to cause one or more computer processors to perform operations comprising:

placing the computed statistics into a data pipeline at data structures associated with the lowest-level time interval; and merging the data structures associated with time intervals of the same level upon receipt of a predetermined number of data structures for the next-lower time interval.

\* \* \* \* \*